US011841068B2

United States Patent
Desing et al.

(10) Patent No.: US 11,841,068 B2
(45) Date of Patent: Dec. 12, 2023

(54) ELECTRONICALLY CONTROLLED DIFFERENTIAL GEARING DEVICE

(71) Applicant: JTEKT AUTOMOTIVE NORTH AMERICA, INC., Plymouth, MI (US)

(72) Inventors: Patrick Desing, Simpsonville, SC (US); Noel R Barnes, II, Victor, NY (US); Michael Kocevar, Toledo, OH (US)

(73) Assignee: JTEKT AUTOMOTIVE NORTH AMERICA, INC., Plymouth, MI (US)

( * ) Notice: Subject to any disclaimer, the term of this patent is extended or adjusted under 35 U.S.C. 154(b) by 0 days.

(21) Appl. No.: 17/733,679

(22) Filed: Apr. 29, 2022

(65) Prior Publication Data

US 2023/0349457 A1 Nov. 2, 2023

(51) Int. Cl.
*F16H 48/22* (2006.01)
*F16H 48/10* (2012.01)
*F16H 48/14* (2006.01)
*F16H 48/32* (2012.01)

(52) U.S. Cl.
CPC ............. *F16H 48/22* (2013.01); *F16H 48/10* (2013.01); *F16H 48/145* (2013.01); *F16H 48/32* (2013.01)

(58) Field of Classification Search
CPC .......... F16H 48/22; F16H 48/10; F16H 48/32; F16H 48/145; F16H 48/11; F16H 2048/106
See application file for complete search history.

(56) References Cited

U.S. PATENT DOCUMENTS

| | | | | |
|---|---|---|---|---|
| 5,080,640 A * | 1/1992 | Botterill | ............. | F16H 63/3043 475/231 |
| 5,083,986 A * | 1/1992 | Teraoka | ................ | F16H 48/295 475/86 |
| 5,156,578 A * | 10/1992 | Hirota | ................ | B60K 17/3462 475/252 |
| 5,269,730 A * | 12/1993 | Hirota | ................ | B60K 17/3462 192/84.91 |
| 5,322,484 A * | 6/1994 | Reuter | .................... | F16H 48/30 475/249 |
| 5,415,598 A * | 5/1995 | Sawase | .................. | B60K 17/20 475/86 |
| 5,456,641 A * | 10/1995 | Sawase | .................... | F16H 48/36 475/86 |
| 6,620,071 B1 * | 9/2003 | Cook | .................. | B60K 17/3462 475/221 |
| 7,354,374 B2 * | 4/2008 | Teraoka | .................. | F16H 48/34 475/231 |

(Continued)

FOREIGN PATENT DOCUMENTS

DE 102015210930 A1 * 12/2016
JP 2007138983 A * 6/2007 ............. F16H 48/10

*Primary Examiner* — Tinh Dang
(74) *Attorney, Agent, or Firm* — Oblon, McClelland, Maier & Neustadt, L.L.P.

(57) ABSTRACT

A differential gearing device includes a base gearing device and an actuator. The base gearing device including a first gear connected to a first output of the differential gearing device, a second gear connected to a second output of the differential gearing device, differential gearing connected to each of the first gear and the second gear, and a clutch connected between the first gear and the second gear. The actuator actuates the clutch to change a torque bias ratio between the first gear and the second gear.

6 Claims, 12 Drawing Sheets

(56) References Cited

U.S. PATENT DOCUMENTS

| | | | |
|---|---|---|---|
| 8,012,058 B2 * | 9/2011 | Fujii | F16H 48/285 |
| | | | 475/249 |
| 8,388,487 B2 * | 3/2013 | Fujii | F16H 48/34 |
| | | | 475/249 |
| 2006/0160652 A1 * | 7/2006 | Maki | F16H 48/24 |
| | | | 475/248 |

* cited by examiner

ELECTRONICALLY CONTROLLED DIFFERENTIAL GEARING DEVICE

FIELD OF THE DISCLOSURE

This disclosure relates generally to vehicles and, more particularly, to a differential gearing device for use in a vehicle drivetrain system.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Drivetrain systems often include a differential to split torque between two wheels. An open differential divided an input torque evenly between the two output wheels. However if one wheel begins to slip, the output torque is reduced at the other wheel by an equivalent amount. A limited-slip differential (LSD) can be used to address the deficiencies of open differentials. An LSD reduces wheel spin of one of the connected wheels. With an LSD, if one wheel begins to slip, more torque is applied to the opposite wheel. Various types of limited slip differentials are available with different mechanical and electrical arrangements. A Torsen® LSD is one such an example that uses helical gears to effect the limited slip function.

BRIEF SUMMARY

A differential gearing device includes a base gearing device and an actuator. The base gearing device including a first gear connected to a first output of the differential gearing device, a second gear connected to a second output of the differential gearing device, differential gearing connected to each of the first gear and the second gear, and a clutch connected between the first gear and the second gear. The actuator actuates the clutch to change a torque bias ratio between the first gear and the second gear.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

The figures are not to scale. In general, the same reference numbers will be used throughout the drawing(s) and accompanying written description to refer to the same or like parts.

DETAILED DESCRIPTION

The description set forth below in connection with the appended drawings is intended as a description of various aspects of the disclosed subject matter and is not necessarily intended to represent the only aspect(s). In certain instances, the description includes specific details for the purpose of providing an understanding of the disclosed subject matter. However, it will be apparent to those skilled in the art that aspects may be practiced without these specific details. In some instances, well-known structures and components may be shown in block diagram form in order to avoid obscuring the concepts of the disclosed subject matter.

Reference throughout the specification to "one aspect" or "an aspect" means that a particular feature, structure, characteristic, operation, or function described in connection with an aspect is included in at least one aspect of the disclosed subject matter. Thus, any appearance of the phrases "in one aspect" or "in an aspect" in the specification is not necessarily referring to the same aspect. Further, the particular features, structures, characteristics, operations, or functions may be combined in any suitable manner in one or more aspects. Further, it is intended that aspects of the disclosed subject matter can and do cover modifications and variations of the described aspects.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "upper," "lower," "front," "rear," "side," "interior," "exterior," and the like that may be used herein, merely describe points of reference and do not necessarily limit aspects of the disclosed subject matter to any particular orientation or configuration. Furthermore, terms such as "first," "second," "third," etc., merely identify one of a number of portions, components, points of reference, operations and/or functions as described herein, and likewise do not necessarily limit aspects of the disclosed subject matter to any particular configuration or orientation.

Figure 1:
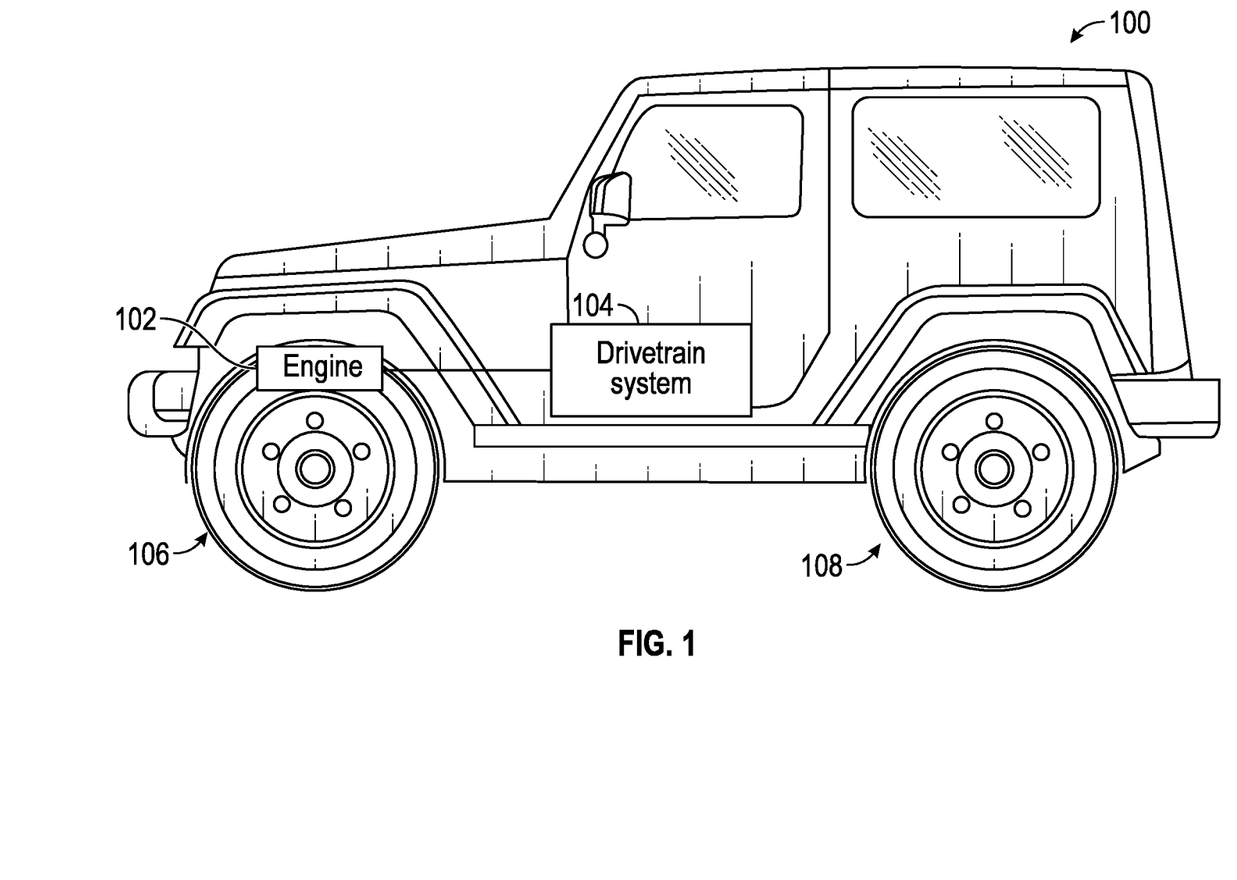
FIG. 1 is a schematic illustration of an example vehicle, in accordance with the teachings of this disclosure.

FIG. 1 is a schematic illustration of a vehicle 100 in accordance with the teachings of this disclosure. The vehicle 100 may include a motor vehicle such as one of a car, a truck, a van, a sport utility vehicle (SUV), or the like. According to the illustrated example of FIG. 1, the vehicle 100 includes an engine 102, a drivetrain system 104, and wheels 106, 108. The engine 102 may be an internal combustion engine. The wheels 106, 108 may be road wheels. The wheel 106 may be a front wheel and the wheel 108 may be a rear wheel. It is understood that the front wheel 106 and the rear wheel 108 can be respectively in pairs. The drivetrain system 104 of FIG. 1 is structured and/or configured to transfer torque from the engine 102 to the wheels 106, 108 to cause the vehicle 100 to move, for example, via drive shafts, gearing, clutches, axles, etc., as discussed further below.

In particular, the drivetrain system 104 of FIG. 1 enables the vehicle 100 to change between a first driving mode such as a two-wheel drive that is associated with a first driving characteristic of the vehicle 100 and a second driving mode such as a four-wheel drive that is associated with a second driving characteristic of the vehicle 100 different from the first driving characteristic. For example, a controller such as an electronic control unit (ECU) 500 (FIG. 8a) of the vehicle 100 transmits power and/or a control or command signal to an actuator system that is associated with the drivetrain system 104 and operatively coupled to a clutch. In response, the actuator system causes the clutch to change between a disengaged state and an engaged sate. The drivetrain system 104 also include the differential gearing device 200 which will be discussed in more detail later.

Figure 2:
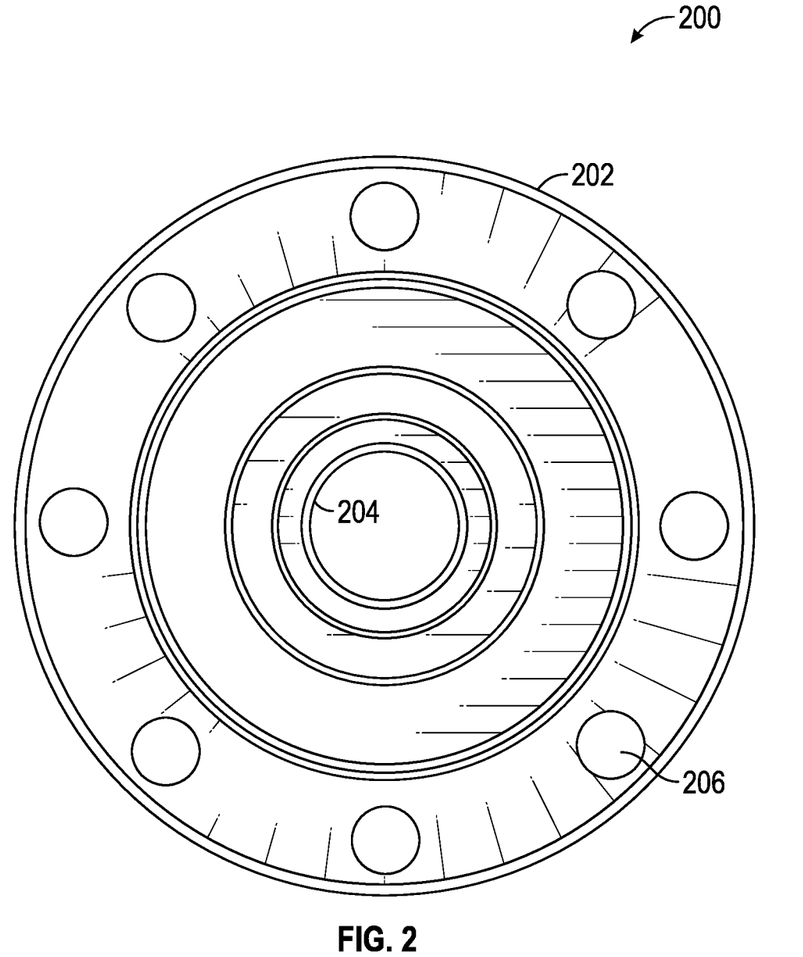
FIG. 2 is a front view of a schematic illustration of an example differential gearing device including a base differential device and an actuator in accordance with the teachings of this disclosure.

FIG. 2 is a front view of a schematic illustration of a differential gearing device 200 in accordance with the teachings of this disclosure.

The differential gearing device 200 may be in the drivetrain system 104 described earlier in FIG. 1. The differential gearing device 200 may include a pair of left side gear and right side gear (shown later in FIG. 4) received within the differential case 202. The differential gearing device 200 may also include splines 204 formed on the inner surface which are connected to one of a left and right axle, not shown.

The differential case 202 is a hollow structure internally formed with a space in which the pair of left and right side gears (shown later in FIG. 4) are received. The differential gearing device 200 may include, but not limited to, the left side gear and right side gear mentioned earlier, ring gears, and pinion gears. In some embodiments, there may be different types of differential gearing devices which include open differential, limited-slip differential, locking differential, and torque-vectoring differential.

The differential case 202 may be cast metal or made of other light weigh materials. In particular, the differential case 202 may be made of aluminum. For example, the shape of the differential case 202 may be different for an open differential, locking differential, or limited-slip differential. In the present disclosure, the differential case 202 may have a flange structure which includes multiple holes 206. The holes 206 may be used to fix the differential case 202 to another structure.

The splines 204 may be ridges or teeth on a shaft that mesh with a mating piece (axle) to transfer torque. The splines 204 on axles may allow the differential gearing device 200 to rotate shafts and to torque to a wheel of the vehicle.

Figure 3:
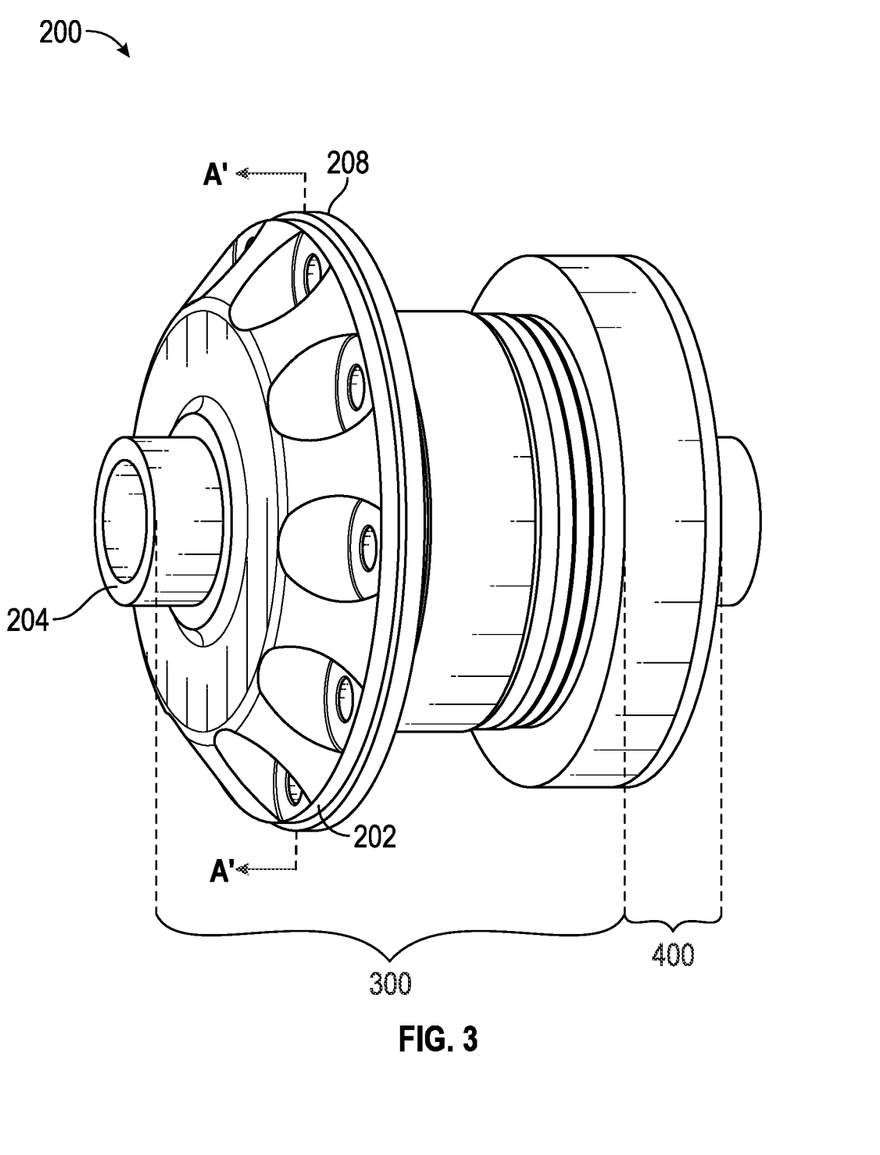
FIG. 3 is a side view of an isometric illustration of an example differential gearing device in accordance with the teachings of this disclosure.

FIG. 3 is a side view of an isometric illustration of an example differential gearing device in accordance with the teachings of this disclosure.

The differential gearing device 200 in FIG. 2 and FIG. 3 may include gears and clutches. As mentioned earlier, the differential gearing device 200 may be in the drivetrain system 104 in FIG. 1. In some examples, the differential gearing device 200 of FIG. 2 and FIG. 3 is implemented in the vehicle 100 of FIG. 1. The differential gearing device 200 may allow an outer drive wheel of the front or rear wheels 106, 108 to rotate faster than an inner drive wheel of the front or rear wheels 106, 108 during a turn. That is, in such examples, the vehicle 100 of FIG. 1 includes the differential gearing device 200.

The differential gearing device 200 may be used to produce difference between rotating numbers of the two output elements such as the outer drive wheels or the inner drive wheels described earlier. In the differential gearing device 200, torque of the engine 102 or an electric motor may be transmitted to the two output elements through a planetary gear mechanism, whereby the difference generated between the two output elements such as the outer drive wheels or the inner drive wheels can be limited or amplified. The differential gearing device 200 may produce and limit a differential rotation between right and left wheels of a set of front wheels 106 or a set of rear wheels 108.

The differential gearing device 200 includes base differential gearing device 300 and an actuator 400. Each will be described later in detail. A ring gear bolt face 208 may be located at one end of the flange structure of the differential case 202. The ring gear bolt face 208 may be used to attach the differential gearing device 200 to another structure.

Figure 4:
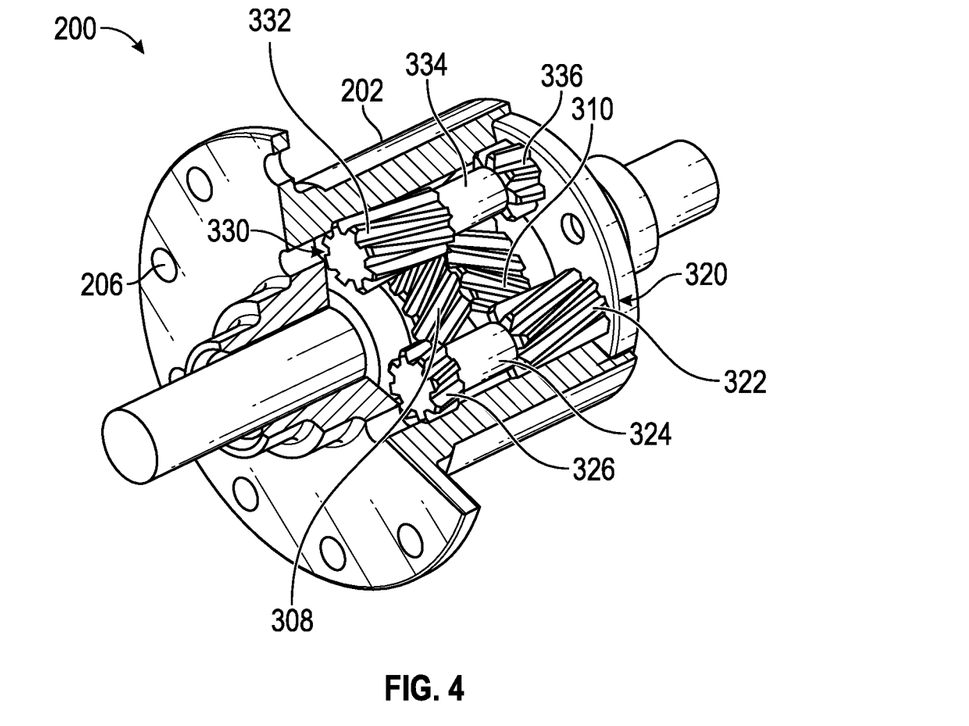
FIG. 4 is a cut-away view of the base differential gearing device in accordance with the teachings of this disclosure.

FIG. 4 is a cut-away view of the base differential gearing device 300 in accordance with the teachings of this disclosure.

The base differential gearing device 300 as illustrated in FIG. 4 is a Torsen® type LSD. Torsen® differentials are torque-biasing, meaning they distribute torque between the a pair of left and right wheels. Torsen® differentials use helical gears in mesh with the left and right gears to bias more torque toward the wheel that is not slipping, without requiring a loss of traction to operate. Torsen® differentials manage the friction that is the result of torque application to the helical gearing. When torque is applied to the gearing, they thrust into the differential casing. This creates friction proportional to the load applied which limits wheel spin and allows bias torque.

By tuning and managing this friction level across the performance range, Torsen® differentials have the ability to support imbalances in traction, allowing the tire with better traction to receive more torque while preventing unwanted wheel spin. A differential's ability to bias more torque to the tire with better traction is characterized as a Torque Bias Ratio (TBR). TBR represents the ratio of a high torque wheel (high traction) to a low torque wheel (low traction) that the differential can allow while remaining locked. The higher the TBR setting, the more aggressive the traction performance is. TBR can be expressed as: TBR=T(hi)/T(lo). As discussed in detail later, TBR can be can be increased by using a clutch between the left and right gears. Here, the clutch capacity is multiplied by TBR in addition to base capacity of the helical gearing. This effectively increases the total TBR of the differential gearing device 200.

The base differential gearing device 300 of FIG. 4 includes a left gear 308 connected to a left wheel of the vehicle 100 and a right gear 310 connected to a right wheel of the vehicle 100. Helical gears 330 and 320 are respectively in mesh with the left gear 308 and the right gear 310. The helical gears 330 and 320 are provided in pairs that mesh with each other. The cut away diagram of FIG. 4. illustrates a helical gear 330 of a first pair of helical gears and a helical gear 320 of a second pair of helical gears. That is, the other of the meshing helical gear of the illustrated helical gears 320 and 330 are not illustrated.

The helical gear 330 includes a first gear portion 332 that meshes with the left gear 308. A second gear portion 336 meshes with the helical gear 320 in mesh with the helical gear 330. A shaft portion 334 connects the first gear portion 332 and the second gear portion 336. Similarly, the helical gear 320 includes a first gear portion 322 that meshes with the right gear 310. A second gear portion 326 meshes with the helical gear 330 in mesh with the helical gear 320. A shaft portion 324 connects the first gear portion 322 and the second gear portion 326.

The helical gears 320 and 330 are illustrated here as being in the axial direction of the differential gearing device 200. However, the helical gears 320 and 330 could also be provided perpendicular to the axial direction. In the perpendicular arrangement, the helical gears would still be respectively meshed with the left gear 308 and the right gear 310 and with each other.

Figure 5:
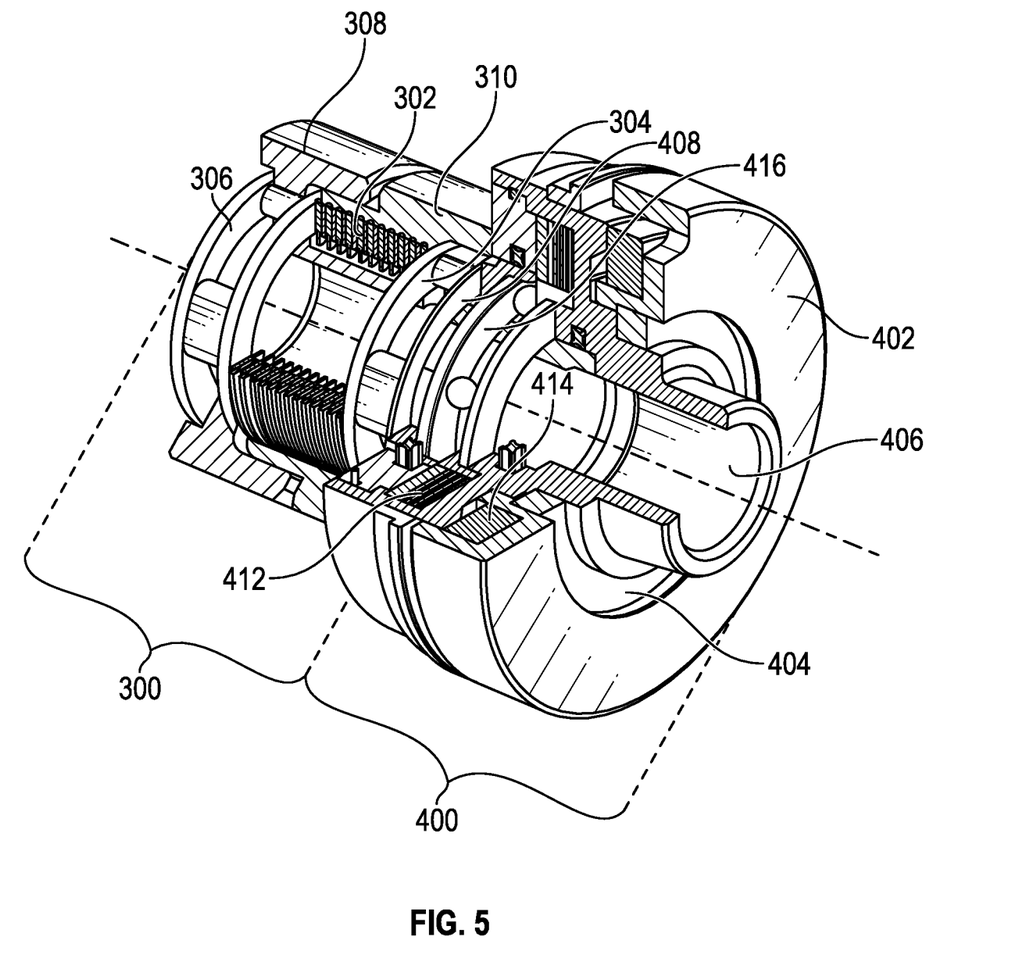
FIG. 5 is a cut-away view of the differential gearing device in accordance with the teachings of this disclosure.

FIG. 5 is a cut-away view of the differential gearing device in accordance with the teachings of this disclosure.

Figure 6:
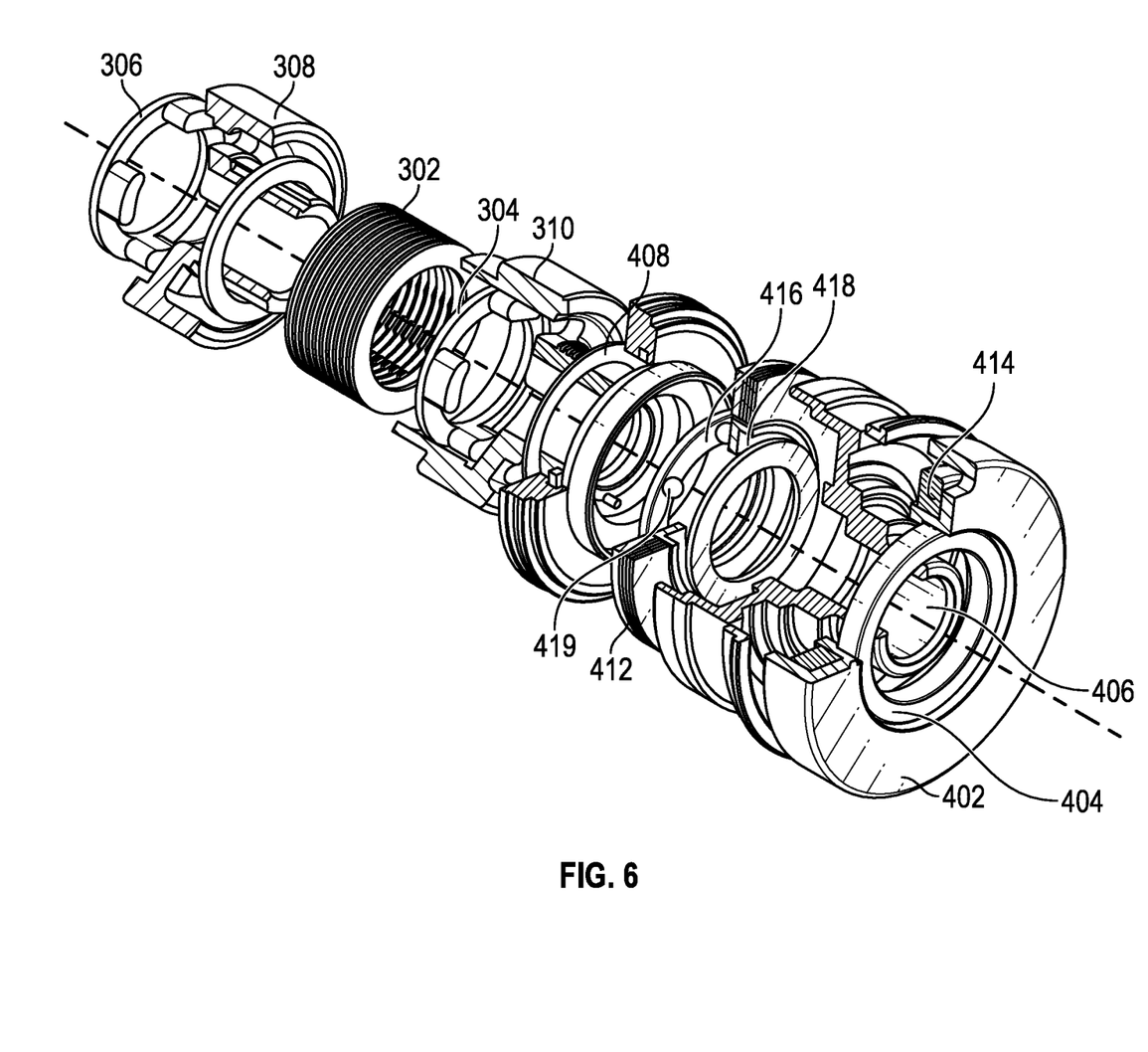
FIG. 6 is an exploded view of the differential gearing device in accordance with the teachings of this disclosure.

FIG. 5 illustrates a cut-away view of the base differential gearing device 300 and the actuator 400. FIG. 6 illustrates an exploded view of the base differential gearing device 300 and the actuator 400. The actuator 400 actuates a clutch 302 connected to the left gear 308 and the right gear 310. It is noted that the actuator 400 can be of any type and is here illustrated as an electrically controlled pilot clutch. The helical gears 320 and 330 are not illustrated but are understood to be in mesh with the left gear 308 and right gear 310 respectively.

The left gear 308 is connected to the spline 204 (FIG. 3) and the right gear 310 is connected to an output spline 406 of the actuator 400. The splines 204 and 406 are respective outputs to of the differential gearing device 200. The input to the differential gearing device 200 being the differential case 202 and specifically the ring gear bolt face 208.

Figure 7:
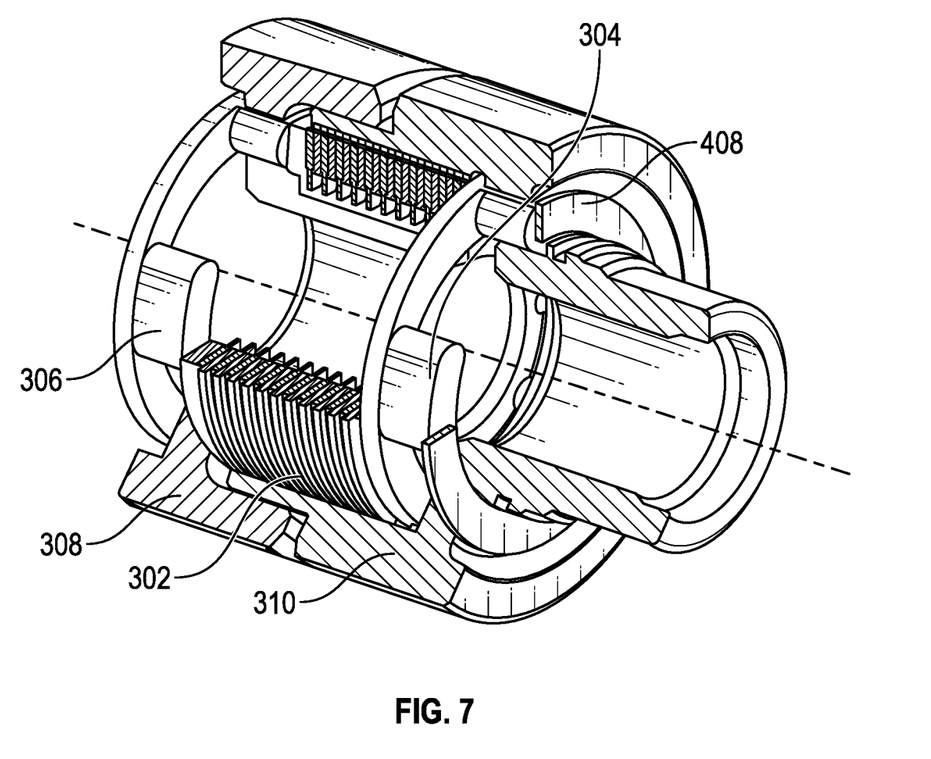
FIG. 7 is a cut-away view of the base differential gearing device in accordance with the teachings of this disclosure.

Clutch 302 is formed in an interior of the base differential gearing device 300. FIG. 7 is a cut-away view of the base differential gearing device in accordance with the teachings of this disclosure. Here, plates of the clutch 302 are respectively connected to a radially inner surface of the right gear 310 and a radially outer surface of an inner portion of the left gear 308. It can be appreciated that the specific arrangement of clutch 302, left gear 308, and right gear 310 can be changed.

The clutch 302 is engaged due to pressing of the piston 304 and the piston 306. Due to an axial force of the actuator 400, the piston 304 and the piston 306 move to press the plates of the 302 together. The actuator 400 includes an apply plate 408 (FIGS. 6 and 7) that presses the piston 304 engage the clutch 302. When pressed, the clutch 302 transfers torque between the left gear 308 and the right gear 310.

The actuator 400 of FIGS. 5 and 6 is an electrically controlled pilot clutch. The actuator 400 includes a coil 414 and a yoke 402 that actuate a pilot clutch 412. The yoke 402 is supported on an inner surface by a bearing 404. The bearing 404 can be a deep groove ball bearing (DGBB) or other type. The yoke 402 being rotationally isolated from the an outer surface of the output spline 406.

The pilot clutch 412 operates a cam to apply an axial force to the apply plate 408. The cam includes a main cam 416, a pilot cam 418, and a plurality of balls 419 between the main cam 416 and the pilot cam 418. Operation of the cam and pilot clutch 412 will be described using FIGS. 8a-8b.

Figure 8A:
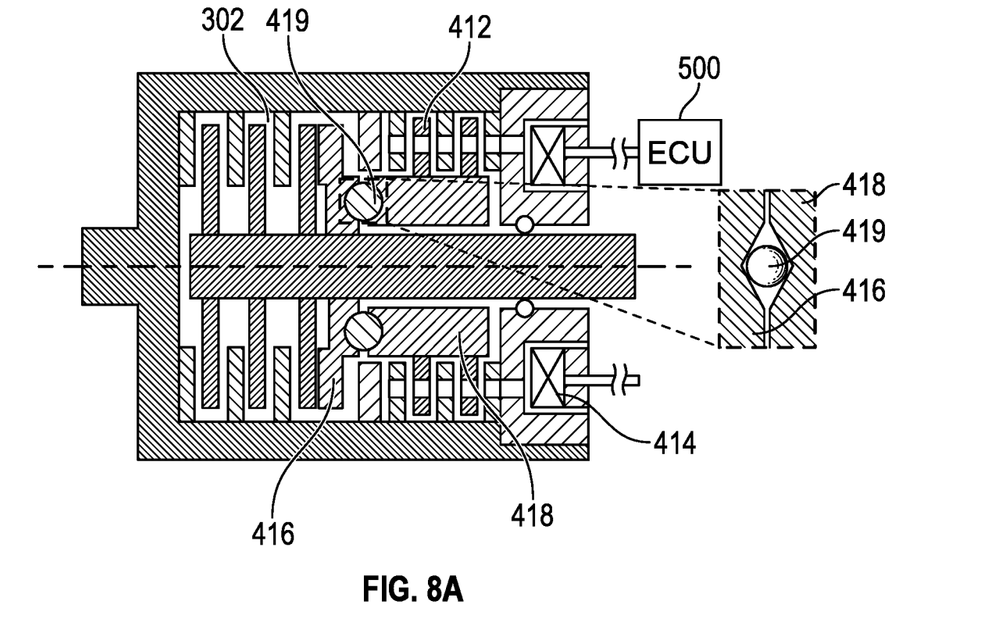
FIGS. 8a and 8b are schematic cross-sectional views of a differential gearing device in accordance with the teachings of this disclosure.

FIG. 8a schematically illustrates the clutch 302 in an open state. Here, the actuator 400 is not applying an axial force to engage the plates of the clutch 302. In FIG. 8a, the pilot cam 418 and the main cam 416 are relatively near each other with the balls 419 located in a groove formed between the pilot cam 418 and main cam 416. When the pilot cam 418 and the main cam 416 rotate relative to each other, the balls 419 move within the ramp shaped groove to separate the main cam 416 and the pilot cam 418. This separation applies an axial force from the main cam 416 to the apply plate 408 which presses the piston 304 (FIG. 7).

Figure 8B:
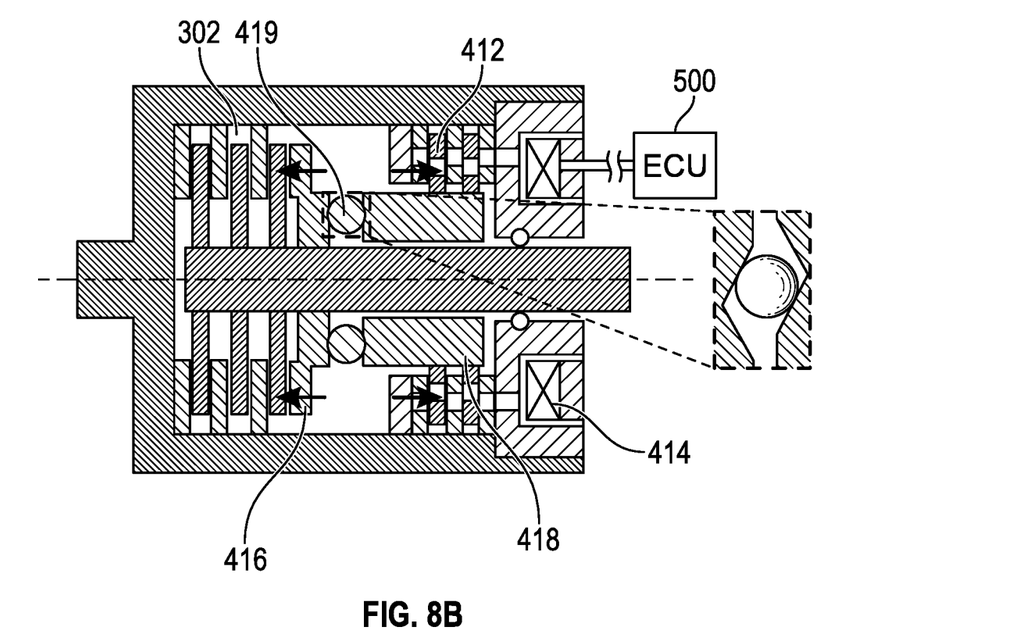

FIG. 8b schematically illustrates the clutch 302 in a closed or slipping state. Here, magnetic flux is generated by the coil 414 and the yoke 402 due to a command by the ECU 500. This magnetic flux pulls the pilot clutch 412 towards the yoke 402 and closes the pilot clutch 412. See the right pair of arrows in FIG. 8b. The pilot cam 418 is attached to the pilot clutch 412. When the pilot clutch 412 closes, the pilot cam 418 and the main cam 416 rotate relative to each other. As the pilot cam 418 moves towards the yoke 402, the balls 419 move along the ramp shaped groove to push the main cam 416 toward the clutch 302. This creates a thrust force in the axial direction that presses the apply plate 408 towards the piston 304. The thrust force causes the clutch 302 to engage. See the left pair of arrows in FIG. 8b.

Figure 9A:
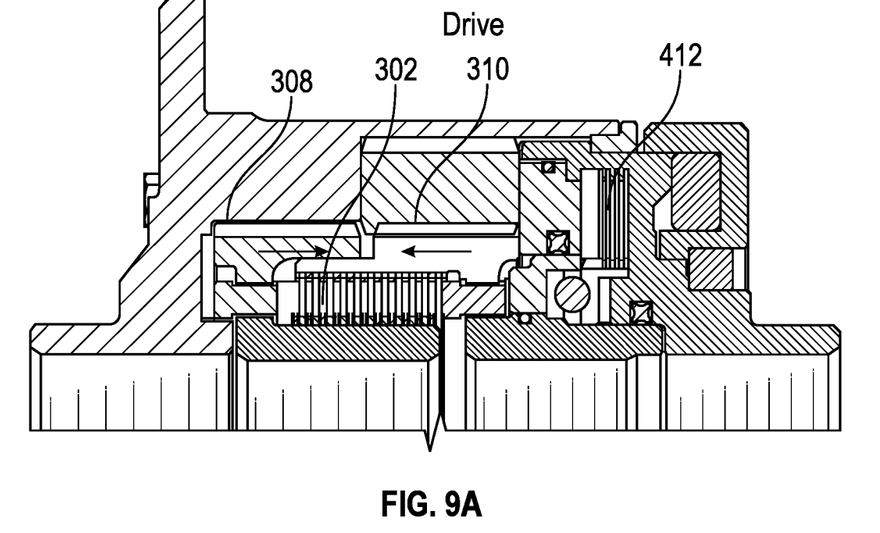
FIGS. 9a and 9b are cross-sectional views of a differential gearing device in accordance with the teachings of this disclosure.
Figure 9B:
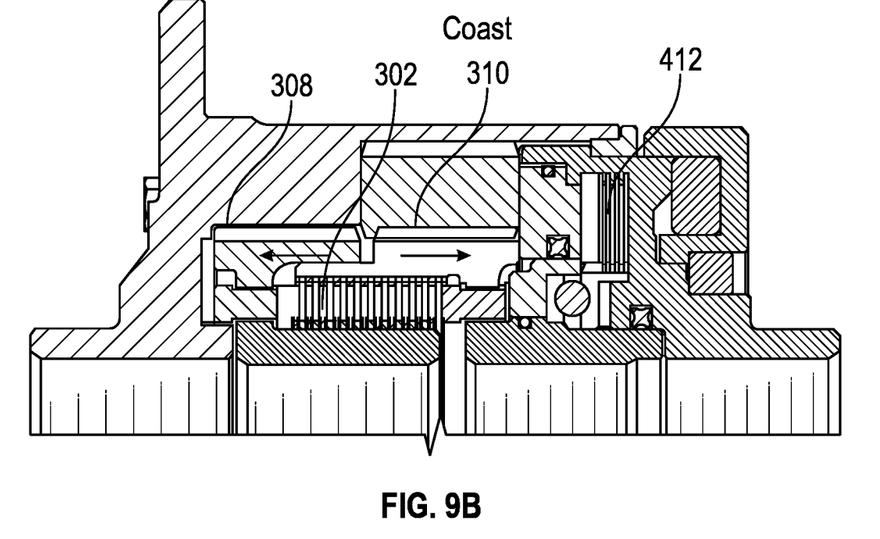

FIGS. 9a and 9b are cross-sectional views of a differential gearing device in accordance with the teachings of this disclosure. In FIGS. 9a and 9b the actuator 400 is OFF and therefore the clutch 302 is open. In FIG. 9a, a torque is input into the differential gearing device 200. Here, there is a side gear thrust due to the Torsen® gears on the left gear 308 and the right gear 310 as illustrated by the arrows. In FIG. 9b, the vehicle is coasting and there is no (or little) input torque. Here, the side gear thrust due to the Torsen® gears on the left gear 308 and the right gear 310 as illustrated by the arrows is in the opposite direction.

Figure 10A:
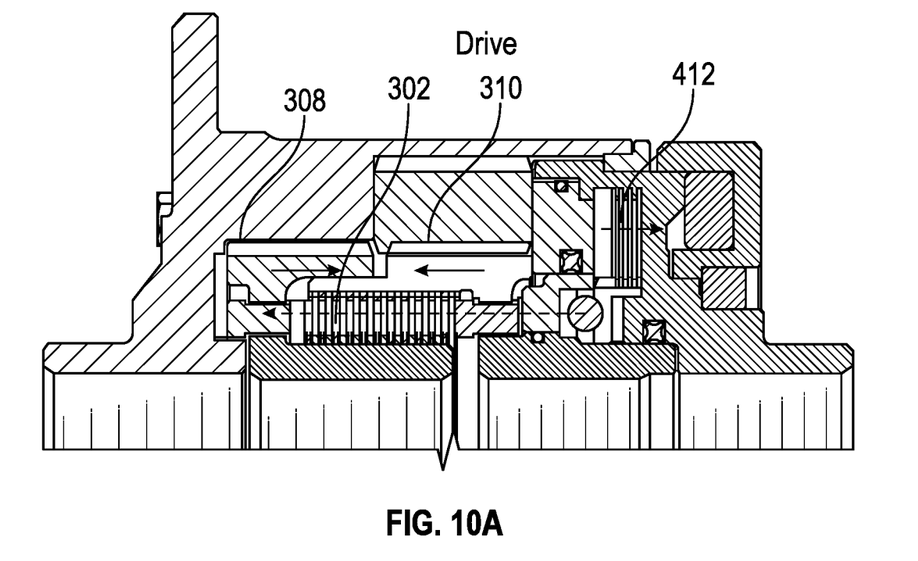
FIGS. 10a and 10b are cross-sectional views of a differential gearing device in accordance with the teachings of this disclosure.
Figure 10B:
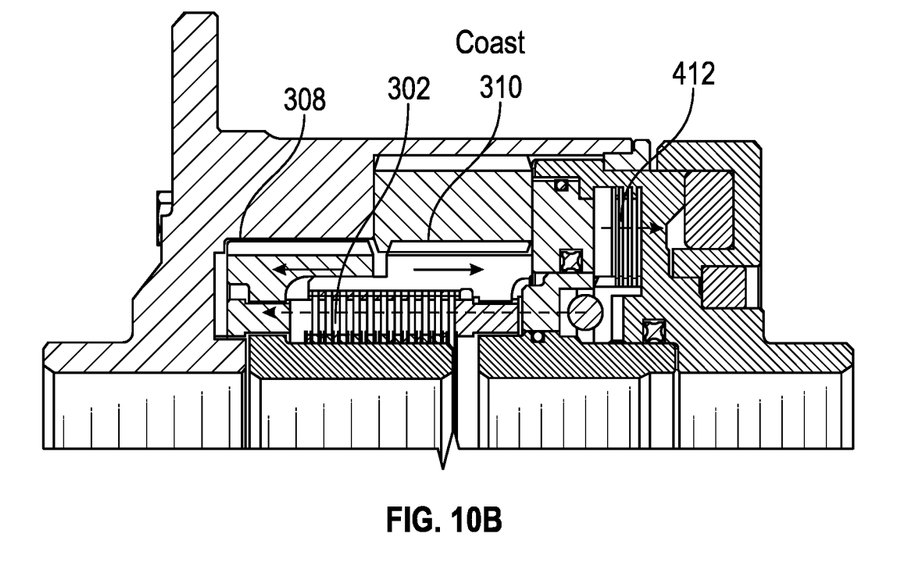

FIGS. 10a and 10b are cross-sectional views of a differential gearing device in accordance with the teachings of this disclosure. In FIGS. 10a and 10b the actuator 400 is ON and therefore the clutch 302 is engaged or at least slipping. In FIG. 10a, a torque is input into the differential gearing device 200. Here, there is a side gear thrust due to the Torsen® gears on the left gear 308 and the right gear 310 as illustrated by the arrows. Additionally, a side gear thrust can be applied by the clutch 302. In FIG. 10b, the vehicle is coasting and there is no (or little) input torque. Here, the side gear thrust due to the Torsen® gears on the left gear 308 and the right gear 310 as illustrated by the arrows is in the opposite direction. Again, a side gear thrust can be modulated by the clutch 302, as illustrated by the arrow. Accordingly, the Torque Bias Ratio (TBR can be can be increased by using a clutch between the left and right gears. Here, the clutch capacity is multiplied by TBR in addition to base capacity of the helical gearing. This effectively increases the total TBR of the differential gearing device 200.

The differential gearing device 200 may be a Torsen® differential with helical gears 320 and 330. The Torsen® differential may be torque-biasing that distributes torque between the tires without requiring a loss of traction to operate. The Torsen® differential of the present disclosure operates by managing the friction that is the result of torque application to the helical gearing. When torque is applied to the gearing, they thrust into the differential casing. That creates friction proportional to the load applied. This friction is what gives it the ability to prevent wheel spin and bias torque.

By tuning and managing that friction level across the performance range, the differential has the ability to support imbalances in traction, allowing the tire with better traction to receive more torque while preventing unwanted wheel spin. The differential's ability to bias more torque to the tire with better traction is characterized as the TBR. This essentially represents the ratio of high traction to low traction that the differential can allow while remaining locked. The higher the TBR setting, the more aggressive the traction performance is.

When torque is applied to the helical gears 320 and 330 a friction is created proportional to the load applied. The friction may prevent wheel spin and the friction may further bias the torque. Therefore, by tuning and managing that friction level across the performance range, the differential gearing device 200 may have the ability to support imbalances in traction. The differential gearing device 200 may also allow tires with a better traction to receive more torque while preventing unwanted wheel spin.

The ability of the differential gearing device 200 to bias more torque to the tires with a better traction is characterized as the Torque Bias Ratio (TBR), which is a ratio of wheels with higher torque and wheels with lower torque. TBR is defined as below:

$$TBR = \frac{T(\text{high})}{T(\text{low})},$$

where T(high) is a torque for wheels with higher torque and T(low) is a torque for wheels with lower torque.

Figure 11:
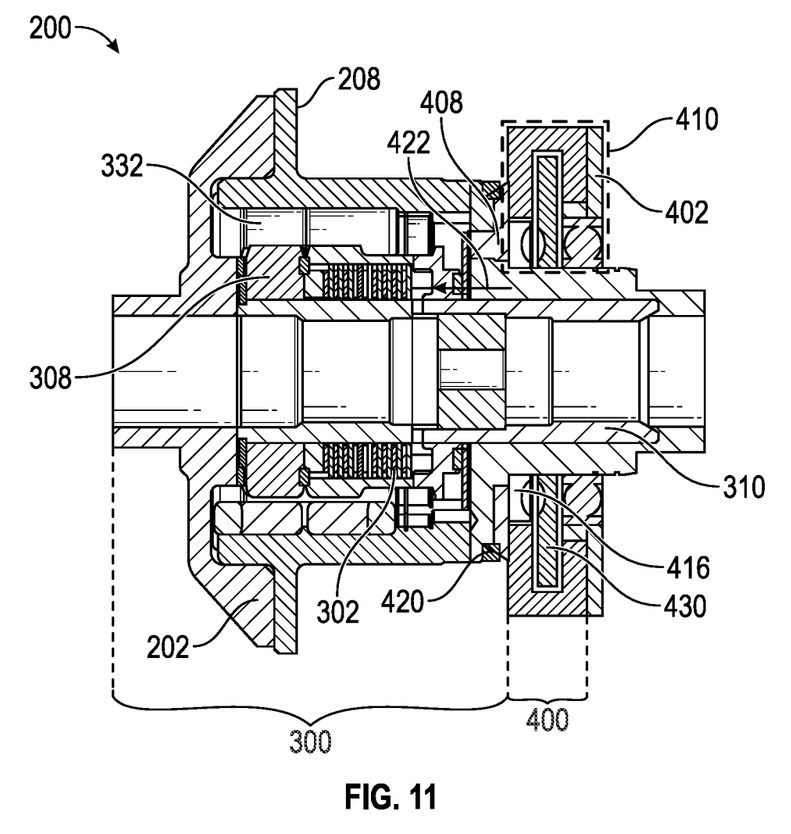
FIG. 11 is a cross-sectional view of a differential gearing device in accordance with the teachings of this disclosure.

FIG. 11 is a cross-sectional view of a differential gearing device 200 along line A'-A' in FIG. 2 in accordance with the teachings of this disclosure. In FIG. 11, the base differential gearing device 300 is essentially the same as that of FIGS. 5-7. However, the actuator 400 is utilizes an eddy current brake instead of a pilot clutch. It can be appreciated the different types of actuators 400 can be used to implement the differential gearing device 200 in combination with the base differential gearing device 300. Examples including: eddy current brake with cam mechanism, electro-magnetic clutch with pilot clutch and cam mechanism, an electric motor with cam mechanism, a hydraulic piston with motor and pump/valve to directly control the clutch, etc.

The actuator 400 includes a cam mechanism similar to the previous embodiment. The cam mechanism including a pilot cam 418, a main cam 416 and a plurality of balls 419 disposed between. A return spring 420 may be adjacent to the coil 414, and the return spring 420 may be used to bias the apply plate 408 and the main cam 416 away from the clutch 302. A dashed box 410 is an area showing the eddy current brake, which includes the coil 414, the pilot cam 418, and the main cam 416, which will be discussed later in FIG. 12.

Figure 12:
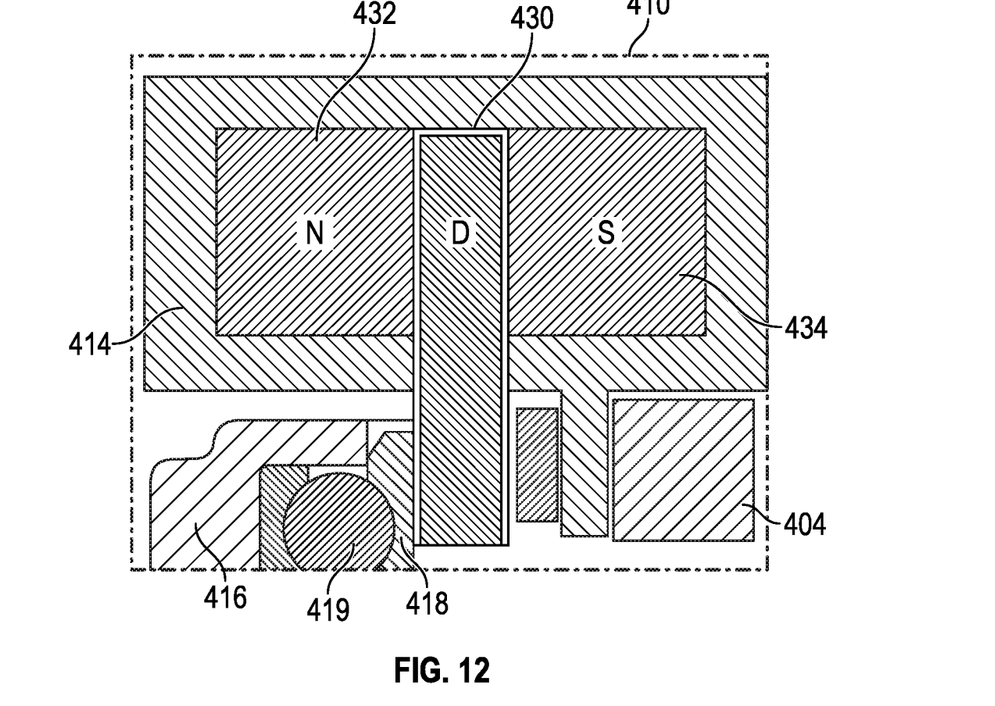
FIG. 12 is a cross-sectional view of an enlarged portion of FIG. 11 in accordance with the teachings of this disclosure.
Figure 13:
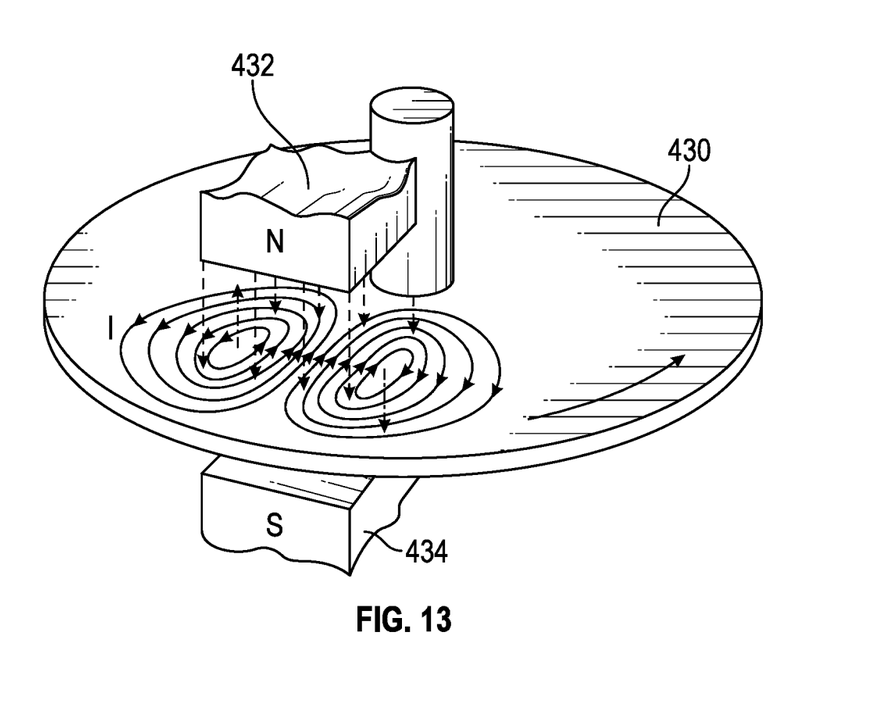
FIG. 13 is a schematic view of an actuator in accordance with the teachings of this disclosure.

FIG. 12 is an enlarged view of the dashed box 410 including the coil and cam assembly of actuator 400, in accordance with the teachings of this disclosure.

As can be seen in FIG. 12, the pilot cam 418 includes a plate 430 that extends radially outward from the pilot cam 418. The plate 430 is between the magnets 432 and 434 which respectively have magnetic poles N and S which are induced by the coil 414 when activated. The magnets 432 and 434 may generate a magnetic field along a direction perpendicular to the plate 430 of the pilot cam 418.

The eddy current on the plate 430 of pilot cam 418 is generated by the coil 414 and the magnets 432 and 434 when a current is applied into the coil 414. The magnetic flux from a rotation of the plate 430 creates a braking torque. The braking torque from the eddy current brake, is transferred to the pilot cam 418 to create a relative a motion between the pilot cam 418 and a main cam 416 in which there is a difference in the respective angular velocities. The use of the eddy current brake including the pilot cam 418 and the coil 414, may slow down the pilot cam 418 in order to initiate the main cam 416 actuation via the balls 419 and ramp shaped groove, previously discussed. This arrangement allows the removal of a pilot clutch to create the relative difference in angular velocities.

FIG. 12 is schematic illustration of the plate 430 of pilot cam 418 and the magnets 432 and 434 induced by coil 414, in accordance with the teachings of this disclosure.

As described earlier, a magnetic field may be generated perpendicularly from the N magnet 432 to the S magnet 434. The coil 414 mentioned earlier may be an electromagnet and may also generate another electro-magnetic field when a current is applied to the coil 414. The eddy current brake uses the drag force created by the eddy current (as illustrated in FIG. 12) as a brake to slow or stop moving objects. Since there is no contact between the plate 430 and the magnets 432 and 434 is no mechanical wear at this interface, unlike a clutch. Using electromagnets, as opposed to permanent magnets, the strength of the magnetic field can be adjusted and so the magnitude of braking effect modulated.

Although certain example apparatus, systems, and methods have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:
1. A differential gearing device, comprising:
    a base gearing device including
        a first gear connected to a first output of the differential gearing device,
        a second gear connected to a second output of the differential gearing device,
        differential gearing connected to each of the first gear and the second gear, and
        a clutch connected between the first gear and the second gear; and
    an actuator that actuates the clutch to change a torque bias ratio between the first gear and the second gear, wherein
    the differential gearing includes a pair of helical gears in mesh with each other, a first helical gear of the pair of helical gears in mesh with the first gear, and a second helical gear of the pair of helical gears in mesh with the second gear, the clutch is disposed radially inside of at least one of the first gear and the second gear, and the differential gearing is radially outward of the first gear and the second gear.

2. The differential gearing device of claim 1, wherein the base gearing device includes a piston that receives a thrust force from the actuator and that presses the clutch.

3. The differential gearing device of claim 1, wherein the actuator includes an apply plate that applies a thrust force to the clutch, a main cam and a pilot cam that push the apply plate to effect the thrust force when rotated relative to each other.

4. The differential gearing device of claim 3, wherein the actuator includes a pilot clutch connected to the pilot cam, and a coil configured to generate a flux that engages the pilot clutch and cause a relative rotation between the main cam and the pilot cam.

5. The differential gearing device of claim 3, wherein the actuator includes a plate connected the pilot cam, and a coil configured to generate an eddy current that creates a braking torque on the plate and causes a relative rotation between the main cam and the pilot cam.

6. The differential gearing device of claim 5, wherein the plate is arranged between a pair of magnets with opposite polarity that are energized by the coil, the magnets inducing a magnetic flux perpendicular to the plate that creates the braking torque.

* * * * *